(12) United States Patent
Huang et al.

(10) Patent No.: US 11,644,312 B1
(45) Date of Patent: May 9, 2023

(54) SINGLE-AXIS ROTATIONAL INERTIAL NAVIGATION SYSTEM BASED ON BIDIRECTIONAL OPTICAL COMMUNICATION AND WIRELESS POWER SUPPLY

(71) Applicant: ZHEJIANG UNIVERSITY, Hangzhou (CN)

(72) Inventors: Tiantian Huang, Hangzhou (CN); Meng Niu, Hangzhou (CN); Lingyun Ye, Hangzhou (CN); Kaichen Song, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/901,295

(22) Filed: Sep. 1, 2022

(51) Int. Cl.
  *G01C 19/32* (2006.01)
  *H02J 50/10* (2016.01)
  (Continued)

(52) U.S. Cl.
  CPC ............ *G01C 19/32* (2013.01); *G01C 19/10* (2013.01); *G01C 19/18* (2013.01); *G01C 21/16* (2013.01);
  (Continued)

(58) Field of Classification Search
  None
  See application file for complete search history.

(56) References Cited

U.S. PATENT DOCUMENTS 5,650,613 A * 7/1997 Lewis ................. G01D 5/34784
  250/214 PR
8,966,978 B2 * 3/2015 Pannek .................... B62D 6/10
  73/514.02
(Continued)

FOREIGN PATENT DOCUMENTS

CN  108075576 A  5/2018
CN  113346628 B  5/2022

OTHER PUBLICATIONS

Apr. 22, 2022, Chinese Notification to Grant Patent issued for related CN Application No. 202110630964.4.

*Primary Examiner* — Paul M. West
*Assistant Examiner* — Mark A Shabman
(74) *Attorney, Agent, or Firm* — Paratus Law Group, PLLC

(57) ABSTRACT

Disclosed is a single-axis rotational inertial navigation system based on bidirectional optical communication and wireless power supply. The system comprises a bidirectional optical communication unit, a wireless power supply unit, a motor driving unit, an inertial measurement unit, a rotating-end information acquisition and processing unit, and a fixed-end information receiving and processing unit. According to the system, in the same transmission channel, information interaction between a rotating end and a fixed end is achieved by adopting infrared light communication and visible light communication; and medium-power high-efficiency wireless energy transmission under a specific distance is achieved by adopting a magnetically coupled resonant wireless power supply method. The design of a (Continued)

high-accuracy motor driving unit is achieved by adopting the design of combining a frameless torque motor with an incremental circular grating and double reading heads.

5 Claims, 4 Drawing Sheets

(51) Int. Cl.
*G01C 21/16* (2006.01)
*G01C 19/18* (2006.01)
*G01C 19/10* (2006.01)
*H01F 27/28* (2006.01)
*H01F 27/24* (2006.01)
*H04B 10/116* (2013.01)

(52) U.S. Cl.
CPC ............. *H01F 27/24* (2013.01); *H01F 27/28* (2013.01); *H02J 50/10* (2016.02); *H04B 10/116* (2013.01)

(56) References Cited

U.S. PATENT DOCUMENTS

| | | | |
|---|---|---|---|
| 11,054,436 B2* | 7/2021 | Lee | G01P 3/66 |
| 2011/0109304 A1* | 5/2011 | Suzuki | H02K 24/00 |
| | | | 324/207.25 |
| 2016/0202284 A1* | 7/2016 | Paquet | G01P 13/00 |
| | | | 73/514.26 |

* cited by examiner

SINGLE-AXIS ROTATIONAL INERTIAL NAVIGATION SYSTEM BASED ON BIDIRECTIONAL OPTICAL COMMUNICATION AND WIRELESS POWER SUPPLY

TECHNICAL FIELD

The present disclosure relates to the technical field of the design of inertial navigation systems, and in particular relates to a single-axis rotational inertial navigation system based on bidirectional optical communication and wireless power supply.

BACKGROUND ART

The inertial navigation system has been one of the key technologies for autonomous long-endurance navigation of underwater carriers due to its high accuracy and light miniaturization design. Rotation modulation technique is an effective means to improve accuracy of the inertial navigation system. By introducing the rotation mechanism, the inertial measurement unit rotates in the full period, and after demodulation, constant drift and slow-varying errors of the inertial sensor in a direction perpendicular to the rotation axis are eliminated or suppressed by means of integral in the full period, thus improving the accuracy of the inertial navigation system.

To flexibly design the indexing scheme and avoid the winding of cables, an existing rotation modulation type inertial navigation system generally employs a conductive slip ring to achieve contact type signal and energy transmission between a rotating part and a fixed part. However, such system has the inherent defects of short service life, reliability reduction caused by long-time frictional wear and the like, there is therefore a need to introduce wireless signal and energy transmission technology into the rotation modulation inertial navigation system.

The wireless power transmission technology applied to the rotation modulation inertial navigation system mainly comprises electromagnetic induction type wireless power supply and electromagnetic resonance type wireless power supply. The transmission efficiency of the electromagnetic induction type wireless power supply is sharply reduced as the distance increases, and the electromagnetic induction type wireless power supply is relatively sensitive to the dislocation of a primary winding and a secondary winding; and the electromagnetic resonance type wireless power supply has low sensitivity to the dislocation of the primary winding and the secondary winding due to its long transmission distance, and is more suitable for being applied to the rotation modulation inertial navigation system, thus achieving high-efficiency wireless power transmission in a case that a certain gap exists between the primary winding and the secondary winding. For example, a wireless power and information transmission apparatus for an inertial navigation system (Patent Number 201611020309.2) disclosed by Gao Tao, Wang Hao, Lei Geyang et al is adopted, which employs the electromagnetic resonance type wireless power supply. A primary power transmission winding and an information transmission winding share a primary magnetic core, and a secondary power transmission winding and a secondary information transmission winding share a secondary magnetic core. Both the wireless power and information are transmitted by a magnetic circuit, leading to a potential problem of mutual interference. Therefore, for the defects of the application of existing wireless communication and wireless power supply in a rotation modulation inertial navigation system, there is an urgent need to research a wireless signal and energy transmission mode suitable for the rotation modulation inertial navigation system, which may prolong the service life of the system and improve the reliability of the system, can achieve full-duplex wireless communication and high-efficiency wireless power supply and can enable the system to have the characteristics of high navigation and positioning accuracy and small volume.

SUMMARY

To overcome the defects in the prior art, the present disclosure provides a single-axis rotational inertial navigation system based on bidirectional optical communication and wireless power supply.

To achieve the objective, the present disclosure employs the technical solution as follows: a single-axis rotational inertial navigation system based on bidirectional optical communication and wireless power supply comprises a rotating part and a fixed part, wherein the rotating part consists of an inertial measurement unit, a rotating-end information acquisition and processing unit, a visible light receiving end PCB (printed circuit board), a wireless power supply secondary winding, a wireless power supply secondary magnetic core, an incremental circular grating and a frameless torque motor rotor; the fixed part consists of an infrared light receiving end PCB, a wireless power supply primary magnetic core, a wireless power supply primary winding, a first reading head, a second reading head, a frameless torque motor stator, a wireless power supply transmitting end PCB, a motor driving board, and a fixed-end information receiving and processing unit.

The incremental circular grating, the frameless torque motor rotor, the first reading head, the frameless torque motor stator and the motor driving board form a motor driving unit, wherein the first reading head is configured to read a rotation angle of the incremental circular grating and to transmit the rotation angle to the motor driving board; the frameless torque motor stator and the frameless torque motor rotor cooperate with each other, and the motor driving unit is configured to drive the frameless torque motor rotor to drive the rotating part to rotate according to a certain indexing scheme.

The first reading head and the second reading head are symmetrically installed on both sides of the incremental circular grating and used to compensate for installation eccentric errors of the motor, thus improving angle measurement accuracy.

The wireless power supply transmitting end PCB, the rotating-end information acquisition and processing unit, the wireless power supply primary magnetic core, the wireless power supply primary winding, the wireless power supply secondary winding and the wireless power supply secondary magnetic core jointly form a wireless power supply unit, wherein the wireless power supply primary winding and the wireless power supply secondary winding are respectively placed in the wireless power supply primary magnetic core and the wireless power supply secondary magnetic core, the wireless power supply transmitting end PCB is configured to drive the wireless power supply primary winding; and the rotating-end information acquisition and processing unit of the rotating part is powered by magnetically coupled resonance between the wireless power supply primary winding and the wireless power supply secondary winding.

The visible light receiving end PCB in the rotating part and the infrared light receiving end PCB in the fixed part form a bidirectional optical communication unit; the rotating-end information acquisition and processing unit is configured to acquire information of the inertial measurement unit, and information interaction between the rotating part and the fixed part is achieved by means of the bidirectional optical communication unit; and the bidirectional optical communication unit is configured to transmit the data of the inertial measurement unit to the fixed-end information receiving and processing unit, thus completing the analysis and processing of the data of the single-axis rotational inertial navigation system.

Further, the bidirectional optical communication unit consists of visible light communication and infrared light communication; the rotating-end information acquisition and processing unit is a rotating end PCB, which is configured to transmit data of the rotating part to the fixed-end information receiving and processing unit by means of the infrared light communication; the fixed-end information receiving and processing unit is a rotation modulation fixed end PCB, which is configured to transmit data of the fixed part to the rotating-end information acquisition and processing unit by means of the visible light communication, thus achieving bidirectional optical communication; the bidirectional optical communication unit has a full-duplex communication function, and a communication protocol may be a UART (Universal Asynchronous Receiver/Transmitter) protocol or other protocols.

Further, the bidirectional optical communication unit is installed inside the magnetic cores of the wireless power supply unit and is coaxially provided; optical signals and electromagnetic signals do not interfere with each other, and the volume of the system is reduced while the wireless signal and energy transmission of the rotating part and the fixed part are achieved.

Further, the wireless power supply secondary winding and the wireless power supply secondary magnetic core are installed at the upper end of the rotating part, and the frameless torque motor rotor is installed at the lower end of the rotating part; the wireless power supply unit and the frameless torque motor are placed at both ends of a rotating body respectively, such that the influence of magnetic leakage on the wireless power supply unit and the frameless torque motor is reduced.

Further, the section of the lower end of the rotating body is in a double-concave shape relative to the rotating center, a lower bearing is installed in a concave groove, the frameless torque motor rotor is installed on the rotating body and coaxial with the rotating center, an upper bearing and the lower bearing are configured to bear axial force and radial force, and the frameless torque motor only provides rotating power; the embedded design is able to further reduce the volume of the system; and the motor driving board is configured to read angle measurement data of the rotating body provided by the first reading head and to control the frameless torque motor to rotate according to the indexing scheme.

Compared with the prior art, the present disclosure has the beneficial effects that: the bidirectional optical communication technology and the wireless power supply technology are simultaneously introduced into the single-axis rotational inertial navigation system to achieve the wireless signal and energy transmission between the rotating part and the fixed part in the single-axis rotational inertial navigation system. The present disclosure has the advantages that the bidirectional optical communication unit is installed in a tank-shaped magnetic core of the wireless power supply unit and is coaxially placed, such that optical signals and electromagnetic signals do not interfere with each other, and the inherent defects of the winding of cables and frictional wear of the conductive slip ring can be avoided. The infrared light communication and the visible light communication are coaxially placed, such that the information interaction between the rotating part and the fixed part in a rotating state may be achieved by using different sensitive bands of the two photosensitive diodes, and the characteristic of full-duplex communication, small volume and high reliability are achieved. By employing the design of combining a frameless torque motor with the incremental circular grating and double reading heads, the installation eccentric error may be compensated, the angle measurement accuracy may be improved, and the volume of the system may be reduced. The frameless torque motor and the wireless power supply unit are respectively placed at both ends of the rotating body, such that the influence of magnetic leakage on the wireless power supply unit and the frameless torque motor may be effectively reduced. In accordance with the present disclosure, small-volume wireless signal and energy transmission in a case of a limited space may be achieved, the information output accuracy of the rotational inertial navigation system is greatly improved, and the rotational inertial navigation system has the characteristics of small volume, high reliability, strong practicability, high navigation information accuracy and the like.

Figure 1:
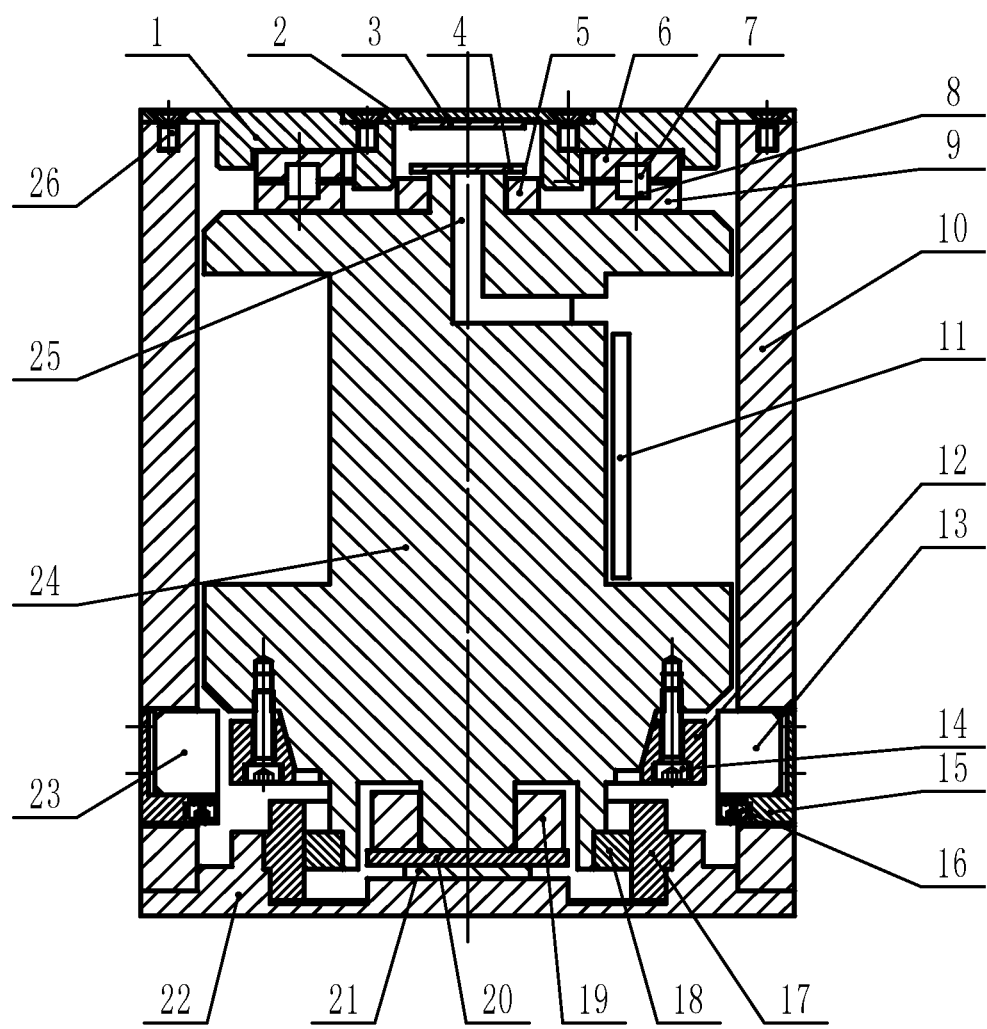
FIG. 1 is a schematic diagram of a partial section of a single-axis rotational inertial navigation system apparatus in accordance with the present disclosure.

In the drawings: 1—fixed end structure upper cover; 2—infrared light receiving end fixed cover plate; 3—infrared light receiving end PCB; 4—visible light receiving end PCB; 5—upper bearing; 6—wireless power supply primary magnetic core; 7—wireless power supply primary winding; 8—wireless power supply secondary winding; 9—wireless power supply secondary magnetic core; 10—fixed end structure, 11—rotating end PCB; 12—incremental circular grating; 14—incremental circular grating installing screw; 13—first reading head; 15—reading head adapter rack; 16—first reading head adjusting screw; 17—frameless torque motor stator; 18—frameless torque motor rotor; 19—lower bearing; 20—adapter; 21—disk spring; 22—fixed end structure lower cover; 23—second reading head; 24—rotating body; 25—rotating body internal information transmission channel; 26—screw; 27—visible light emitting diode; 28—infrared light emitting diode; 29—visible light photosensitive diode; 30—infrared light photosensitive diode; 31—wireless power supply transmitting end PCB; 32—motor driving board; 33—rotation modulation fixed end PCB; 34—rotation modulation fixed end optical communication interface.

DETAILED DESCRIPTION OF THE EMBODIMENTS

The following further describes the present disclosure in detail with reference to the accompanying drawings and the specific examples. The present disclosure includes, but is not limited to, the following embodiments.

Figure 3:
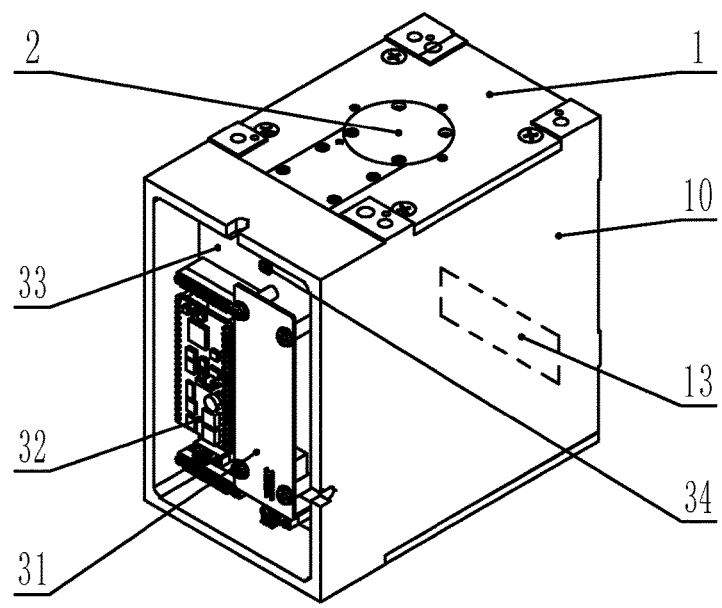
FIG. 3 is a structural schematic diagram of a single-axis rotation modulation system.

The present disclosure provides a single-axis rotational inertial navigation system based on bidirectional optical communication and wireless power supply. As shown in FIG. 1 and FIG. 3, the system comprises a rotating part and a fixed part. The rotating part consists of an inertial measurement unit, a rotating end PCB 11, a visible light receiving end PCB 4, a wireless power supply secondary winding 8, a wireless power supply secondary magnetic core 9, an increment circular grating 12, an incremental circular grating installing screw 13, a frameless torque motor rotor 18, and a plurality of connecting screws. The fixed part consists of a fixed end structure upper cover 1, an infrared light receiving end fixed cover plate 2, an infrared light receiving end PCB 3, a wireless power supply primary magnetic core 6, a wireless power supply primary winding 7, a fixed end structure 10, reading heads and adapter racks thereof, a frameless torque motor stator 17, an adapter 20, a disk spring 21, a fixed end structure lower cover 22, a wireless power supply transmitting end PCB 31, a motor driving board 32, a rotation modulation fixed end PCB 33, and a plurality of screws. The infrared light receiving end fixed cover plate 2 is installed at the fixed end structure upper cover 1 by the screw, the fixed end structure upper cover 1 and the fixed end structure lower cover 22 are installed at the fixed end structure by the screws. The rotating part and the fixed part are connected by an upper bearing 5 and a lower bearing 19. The disk spring 21 acts on a rotating body 24 by means of the adapter 20, and the use of the disk spring 21 may bear a large axial load in a case that the axial space is relatively smaller. The incremental circular grating 12, the frameless torque motor rotor 18, a first reading head 13, the frameless torque motor stator 17 and the motor driving board 32 form a motor driving unit. The first reading head 13 is configured to read a rotation angle of the incremental circular grating 12 and to transmit the rotation angle to the motor driving board 32. The motor driving unit is configured to drive the frameless torque motor rotor 18 to drive the rotating part to rotate according to a certain indexing scheme. The wireless power supply transmitting end PCB 31, the rotating-end information acquisition and processing unit, the wireless power supply primary magnetic core 6, the wireless power supply primary winding 7, the wireless power supply secondary winding 8 and the wireless power supply secondary magnetic core 9 jointly form a wireless power supply unit. The wireless power supply transmitting end PCB 31 is configured to drive the wireless power supply primary winding 7, and the rotating-end information acquisition and processing unit of the rotating part is powered through magnetic coupling resonance between the wireless power supply primary winding 7 and the wireless power supply secondary winding 8. The visible light receiving end PCB 4 in the rotating part and the infrared light receiving end PCB 3 in the fixed part form a bidirectional optical communication unit. The inertial measurement unit consists of three orthogonally arranged gyroscopes and three orthogonally arranged accelerometers. The gyroscopes are configured to measure an angular velocity of a carrier relative to an inertial space, and the accelerometers are configured to measure an acceleration of the carrier relative to the inertial space. The rotating-end information acquisition and processing unit is configured to acquire information of the inertial measurement unit, and information interaction between the rotating part and the fixed part is achieved by means of the bidirectional optical communication unit. The bidirectional optical communication unit is connected to a rotation modulation fixed end optical communication interface 34 in the fixed-end information receiving and processing unit through a flexible board, and is configured to transmit the data of the inertial measurement unit to the fixed-end information receiving and processing unit, thus completing the analysis and processing of the data of the single-axis rotational inertial navigation system.

Figure 2:
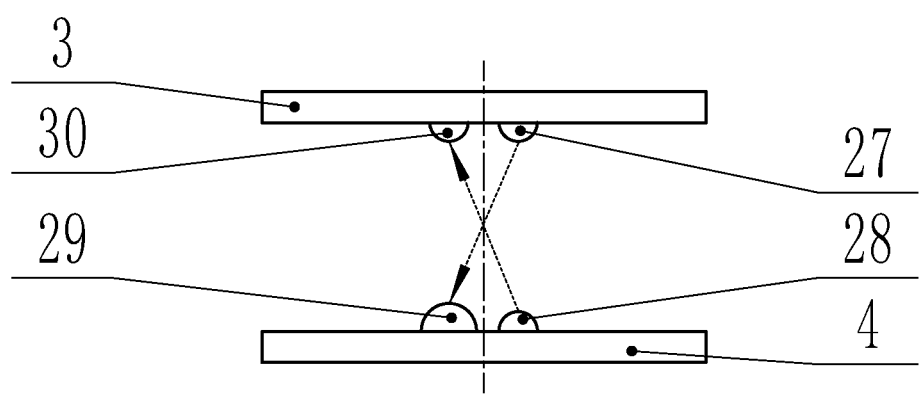
FIG. 2 is a structural schematic diagram of bidirectional optical communication.

As shown in FIG. 2, the bidirectional optical communication unit consists of visible light communication and infrared light communication. The rotating-end information acquisition and processing unit is a rotating end PCB 11, which is configured to transmit data of the rotating part to the fixed-end information receiving and processing unit by means of the infrared light communication. The fixed-end information receiving and processing unit is a rotation modulation fixed end PCB 33, which is configured to transmit data of the fixed part to the rotating-end information acquisition and processing unit by means of the visible light communication, thus achieving bidirectional optical communication. The bidirectional optical communication unit also has a full-duplex communication function, and a communication protocol may be a UART protocol or other protocols. The bidirectional optical communication unit consists of the infrared light receiving end PCB 3 and the visible light receiving end PCB 4. The infrared light receiving end PCB 3 is provided with a visible light emitting diode 27 and a driving circuit thereof, and an infrared light photosensitive diode 30 and a receiving circuit thereof. The visible light emitting diode 27 and the infrared light photosensitive diode 30 are both installed close to the rotating center, and the infrared light receiving end PCB 3 is installed on the infrared light receiving end fixed cover plate 2 by the screw. The visible light receiving end PCB 4 is provided with an infrared light emitting diode 28 and a driving circuit thereof, and a visible light photosensitive diode 29 and a receiving circuit thereof. The infrared light emitting diode 28 and the visible light photosensitive diode 29 are both installed close to the rotating center, and the visible light receiving end PCB 4 is installed on the rotating body 24 by the screw. The infrared light receiving end PCB 3 and the visible light receiving end PCB 4 are both circular, with the installation center coaxial with the rotating center and about 5 mm apart from each other.

Figure 5:
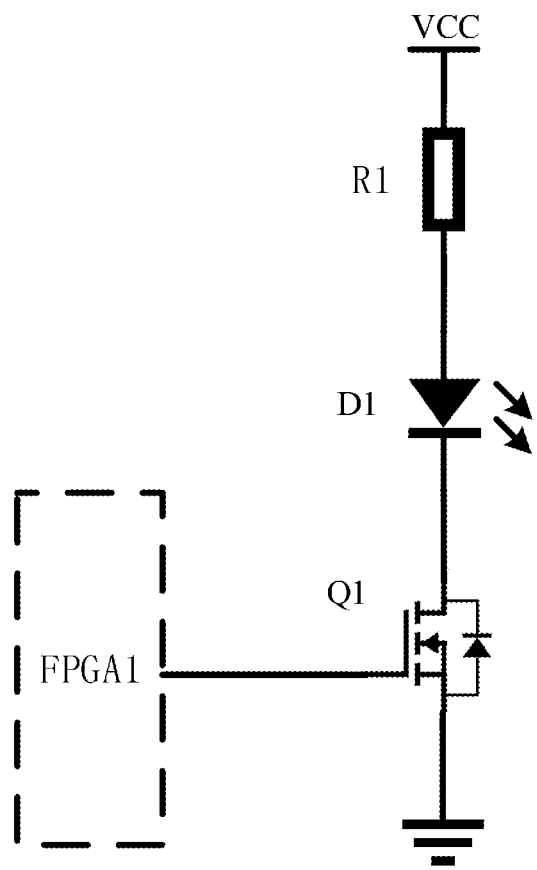
FIG. 5 is a schematic diagram of an optical communication light-emitting diode circuit and a driving circuit thereof.

The circuit design method of the bidirectional optical communication unit is introduced by taking infrared light communication as an example. A visible light communication circuit and an infrared light communication circuit have the same topological structure, and the difference is only that resistance values and capacitance values selected in the circuits are different. As shown in FIG. 5, the infrared light emitting diode and the driving circuit thereof consist of a field effect transistor Q1, an infrared light emitting diode D1, a resistor R1 and an external interface thereof. The external interface mainly comprises a power supply line and a signal line. The power supply line is configured to provide a required power supply for the optical communication light emitting diode and the driving circuit thereof; and the signal line is configured to connect a gate of the field effect transistor Q1 to an FPGA pin on the rotation modulation fixed end PCB 33. The design of the power supply VCC and the selection of the resistance value of the resistor R1 are made according to the driving current required by the infrared light emitting diode.

Figure 6:
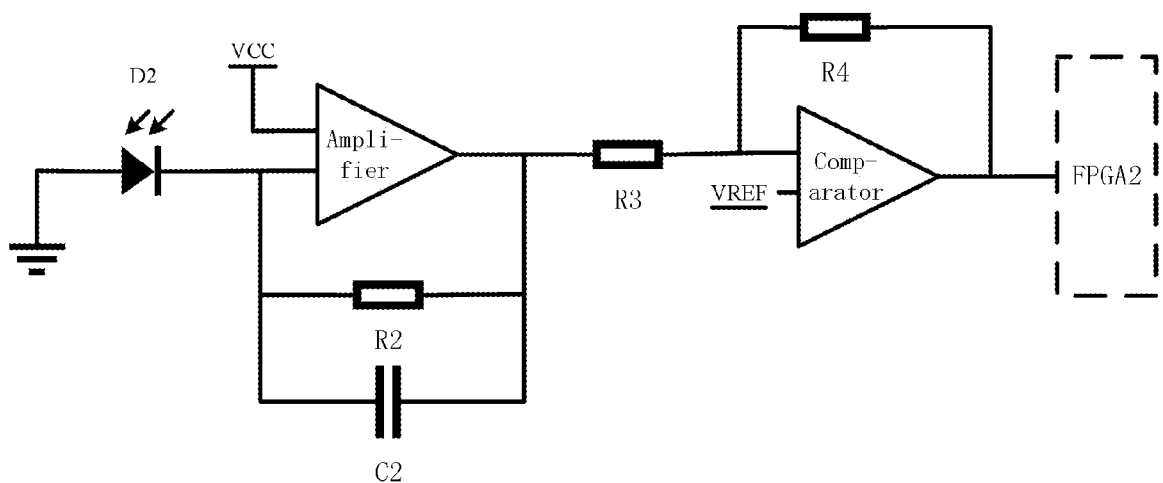
FIG. 6 is a schematic diagram of an optical communication photosensitive diode and a processing circuit thereof.

As shown in FIG. 6, the infrared light photosensitive diode and the processing circuit thereof mainly consist of an infrared light photosensitive diode D1, a photosensitive diode special amplifier, a hysteresis comparator, and an external interface. The external interface mainly has the functions of a power supply line and a signal line, and the power supply line is configured to provide a required power supply for the infrared light photosensitive diode and the processing circuit thereof. The signal line is configured to connect the output end of the comparator to an FPGA2 pin on the rotating end PCB 11 and to receive information. The infrared light photosensitive diode D2, the photosensitive diode amplifier and the hysteresis comparator circuit are connected step by step, and the communication protocol is a UART protocol or other protocols.

The infrared light emitting diode and the driving circuit thereof are integrated on the visible light receiving end PCB 4, the infrared light photosensitive diode and the processing circuit thereof are integrated on the infrared light receiving end PCB 3. It is designed that the two PCBs are 5 mm apart from each other, thus guaranteeing that the infrared light optical communication does not generate communication error due to rotation of the rotating body.

The wireless power supply unit employs magnetically coupled resonant wireless power supply and consists of a wireless power supply primary end and a wireless power supply secondary end. The wireless power supply primary end consists of a primary driving circuit, a wireless power supply primary magnetic core 6 and a wireless power supply primary winding 7, and the primary driving circuit is a wireless power supply transmitting end PCB 31. The wireless power supply secondary end consists of a secondary processing circuit, a wireless power supply secondary winding 8 and a wireless power supply secondary magnetic core 9, and the secondary processing circuit is integrated on the rotating end PCB 11. The wireless power supply primary magnetic core 6 and the wireless power supply secondary magnetic core 9 are both of a tank-shaped structure and are identical in size, and the central axis of the structure coincides with the central axis of the rotating body. The wireless power supply primary winding 7 and the wireless power supply secondary winding 8 are respectively placed in the wireless power supply primary magnetic core 6 and the wireless power supply secondary magnetic core 9 and are anticlockwise wound. The wireless power supply winding is fixed into the wireless power supply magnetic core by a glue, the wireless power supply secondary magnetic core 9 is fixed onto the rotating body 24 by PEEK (polyether-etherketone) screws, and the wireless power supply primary magnetic core 6 is installed on the fixed end structure upper cover 1 by the PEEK screw.

Figure 4:
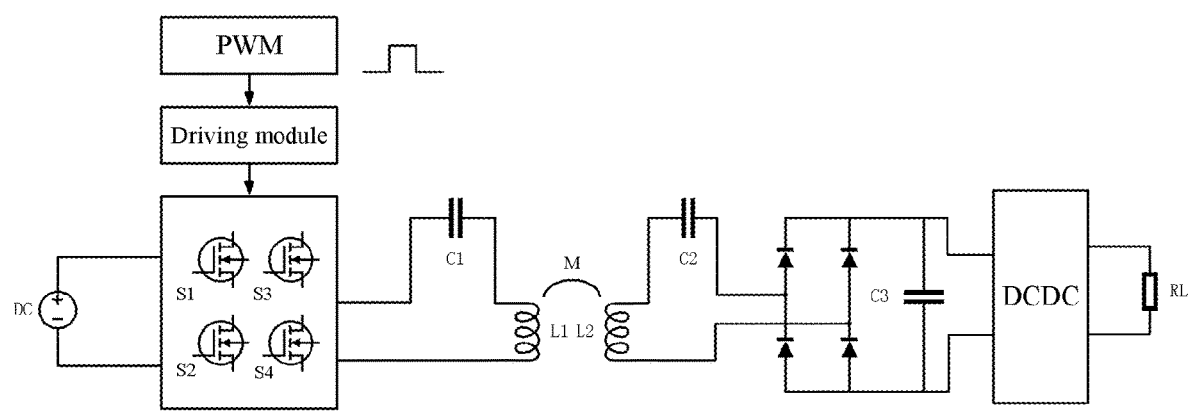
FIG. 4 is a schematic diagram of a circuit of a magnetically coupled resonant wireless power supply system.

As shown in FIG. 4, the primary driving circuit mainly consists of a direct-current voltage DC, a controller, a full-bridge inverter circuit, a primary resonant compensation capacitor C1, and a primary inductor L1. The controller is generally a single-chip microcomputer. The full-bridge inverter circuit mainly consists of a driving module and four N-channel field effect transistors. The single-chip microcomputer generates two paths of complementary square wave signals with dead zones, the square wave signals are connected to a driving module, and the output of the driving module is connected to the four N-channel field effect transistors. The direct-current voltage DC is configured to power the N-channel field effect transistors, and the primary resonant compensation capacitor C1 and the primary inductor L1 are connected to the output end of the full-bridge inverter circuit in series. A circuit excitation frequency f may be changed by the controller, and an inherent frequency f1 of the wireless power supply primary circuit is determined by the C1 and the L1, $$f1 = \frac{1}{2\pi\sqrt{L1C1}}.$$

The secondary processing circuit mainly consists of a secondary inductor L2, a secondary resonant compensation capacitor C2, a secondary rectification filter circuit, a secondary power supply, and a load. The secondary inductor L2 and the secondary resonant compensation capacitor C2 are connected in series and then are connected into the secondary rectification filter circuit. The output end of the secondary rectification filter circuit is connected into the secondary power supply DC/DC. The secondary voltage stabilization is achieved by means of the secondary power supply, the power supply has small ripples and may be directly configured to power the load. The load is a rotating end PCB 11 on the rotating body 24. An inherent frequency f2 of the wireless power supply secondary circuit is determined by the C2 and the L2, $$f2 = \frac{1}{2\pi\sqrt{L2C2}}.$$

When the circuit excitation frequency f is equal to the inherent frequency f1 of primary circuit and the inherent frequency f2 of the secondary circuit, the wireless power supply system is in a resonance state, and the output power of the circuit reaches the highest at the moment. M is the mutual inductance between the primary winding and the secondary winding, the size of the mutual inductance M is related to the installation distance between the primary winding and the secondary winding, the size of the magnetic core, the number of turns of the primary coil and the number of turns of the secondary coil. Meanwhile, the mutual inductance M also affects system characteristic parameters such as a voltage gain, transmission efficiency and output power of the magnetically coupled resonant wireless power supply system. In order to ensure that various parameters in the wireless power supply system meet the operating requirements and the magnetic leakage is small, the installation distance is generally smaller than 2 mm; the larger the DC voltage, the higher the output power of the system. The DC voltage is generally designed to be 17V to 24V in order to ensure that the wireless power supply system may provide required power for the rotating part. The primary end and the secondary end of the wireless power supply system are both configured to compensate the series resonant capacitors, with the advantages that system resonance point does not change along with the change of load resistance. Due to the fact that the maximum value of the input voltage of the secondary power supply DC/DC is finite, the voltage gain of the wireless power supply system needs to be reasonably designed so as to make the output power and the transmission efficiency meet the system requirement while meeting the input voltage requirement of the secondary power supply.

Further, the bidirectional optical communication unit is installed inside the magnetic core of the magnetic power supply unit and is coaxially provided. Optical signals and electromagnetic signals do not interfere with each other, and the volume of the system is reduced while the wireless signal and energy transmission between the rotating part and the fixed part is achieved.

The rotation mechanism mainly consists of a frameless torque motor, an incremental circular grating 12, a first reading head 13, and a motor driving board 32. The section of the lower end of the rotating body 24 is in a double-concave shape relative to the rotating center, and a lower bearing 19 is installed in a concave groove. The frameless torque motor rotor 18 is installed on the rotating body 24 and coaxial with the rotating center. An upper bearing 5 and the lower bearing 19 are configured to bear axial force and radial force, and the frameless torque motor only provides rotating power. The embedded design may further reduce the volume of the system. The motor driving board 32 is configured to read angle measurement data of the rotating body 24 provided by the first reading head 13 and to control the frameless torque motor to rotate according to the indexing scheme.

The system is further provided with a second reading head 23, the first reading head 13 and the second reading head 23 are symmetrically installed on both sides of the incremental circular grating 12. The first reading head 13 is installed on the reading head adapter rack 15 by a first reading head adjusting screw 16, and the first reading head adjusting screw 16 is configured to adjust a vertical distance between the first reading head 13 and the incremental circular grating 12. Due to the fact that angle errors caused by installation eccentricity generated by the two reading heads installed diametrically are equal in size and opposite in sign, most of influences of angle measurement errors caused by installation eccentricity may be compensated, such that the angle measurement precision is improved, the high-accuracy information demodulation of the rotation modulation inertial navigation system is achieved, and the accuracy of the navigation output information is improved.

The wireless power supply secondary winding 8 and the wireless power supply secondary magnetic core 9 are installed at the upper end of the rotating part, and the frameless torque motor rotor 18 is installed at the lower end of the rotating part. The wireless power supply unit and the frameless torque motor are placed at both ends of the rotating body 24 respectively, such that the influence of magnetic leakage on the wireless power supply unit and the frameless torque motor is reduced.

A compensation method for the single-axis rotation modulation inertial navigation error mainly comprises following steps:

Firstly, defining coordinate systems used in the compensation method for the single-axis rotation modulation inertial navigation error: a geocentric inertial coordinate system (i system, $o_i x_i y_i z_i$) takes the center of the earth as the origin, the $o_i x_i$ axis and the $o_i y_i$ axis are located in the equatorial plane of the earth, where the $o_i x_i$ axis points to vernal equinox, the $o_i z_i$ axis is the earth's axis of rotation pointing to the north pole, and the three axes conform to the right-hand rule; a geographic coordinate system (l system, $o_l x_l y_l z_l$) takes the center of a carrier as the origin, where the $o_l x_l$ axis points to east longitude, the $o_l y_l$ points to the north latitude, the $o_l z_l$ axis is perpendicular to ellipsoid of revolution of the earth and points to a direction of the sky, and the three axes conform to the right-hand rule; a navigation coordinate system (n system, $o_n x_n y_n z_n$) employs the geographic coordinate system as a navigation reference coordinate system; a carrier coordinate system (b system, $o_b x_b y_b z_b$) takes the center of the carrier as the original, the $o_b x_b$ axis points to the right along the transverse axis of the carrier, the $o_b y_b$ axis points along the longitudinal axis of the carrier, the $o_b z_b$ axis points to the front along the vertical axis of the carrier, and the three axes conform to the right-hand rule; and an inertial measurement unit coordinate system (s system, $o_s x_s y_s z_s$) takes the gravity center of an inertia measurement assembly as the origin, and has three axes pointing to the directions of sensitive axes of an inertia device.

Step one: the rotating-end information acquisition and processing unit is configured to acquire information of the inertial measurement unit, the fixed-end information receiving and processing unit is configured to transmit a command to the rotating-end information acquisition and processing unit by means of visible light communication, and the rotating-end information acquisition and processing unit is configured to return a frame of data of the gyroscopes ($w_{isx}^s, w_{isy}^s, w_{isz}^s$) and the accelerometers ($f_{isx}^s, f_{isy}^s, f_{isz}^s$) to the fixed-end information receiving and processing unit by means of infrared light communication.

Step two: an angle measured by the first reading head 13 is θ1 and an angle measured by the second reading head 23 is θ2, the first reading head and the second reading head are both installed on both sides of the incremental angle grating 12 diametrically opposite, such that an angle measured value after compensating for the installation eccentricity is θ. The compensation formula is $$\theta = \frac{\theta_1 + \theta_2 - 180}{2},$$

and the angular unit is degree.

Step three: the fixed-end information receiving and processing unit is configured to demodulate the received gyroscope and accelerometer data by utilizing compensated synchronous angle measurement information, a rotation axis of the motor and the Z axis are in the same direction, a conversion matrix from the s system to the b system is $C_s^b$: where $$C_s^b = \begin{bmatrix} \cos\theta & -\sin\theta & 0 \\ \sin\theta & \cos\theta & 0 \\ 0 & 0 & 1 \end{bmatrix}.$$

The gyroscope is taken as an example, $$\Delta w^b = C_s^b \Delta w^s = \begin{bmatrix} \Delta w_x \cos\theta - \Delta w_y \sin\theta \\ \Delta w_x \sin\theta + \Delta w_y \cos\theta \\ \Omega \end{bmatrix},$$

$\Delta w^s$ is the gyroscope error under the inertial measurement unit coordinate system, $\Delta w^b$ is an error term under the carrier system, 0 is a rotation angular velocity of the motor, and such term should be compensated during demodulation. The navigation calculation algorithm employs a pure inertial navigation calculation algorithm, and calculation is performed under the navigation coordinate system, constant values and slow-varying errors of the two-axis sensor perpendicular to the rotation axis may be suppressed, and finally high-accuracy navigation positioning information is output.

Various changes may be made according to the content in the description and claims provided by the present disclosure. All changes based on the claims of the present disclosure shall fall within the scope of protection of the present disclosure.

What is claimed is:

1. A single-axis rotational inertial navigation system based on bidirectional optical communication and wireless power supply, comprising a rotating part and a fixed part, wherein the rotating part consists of an inertial measurement unit, a rotating-end information acquisition and processing unit, a visible light receiving end PCB (4), a wireless power supply secondary winding (8), a wireless power supply secondary magnetic core (9), an incremental circular grating (12) and a frameless torque motor rotor (18); the fixed part consists of an infrared light receiving end PCB (3), a wireless power supply primary magnetic core (6), a wireless power supply primary winding (7), a first reading head (13), a second reading head (23), a frameless torque motor stator (17), a wireless power supply transmitting end PCB (31), a motor driving board (32), and a fixed-end information receiving and processing unit;

the incremental circular grating (12), the frameless torque motor rotor (18), the first reading head (13), the frameless torque motor stator (17) and the motor driving board (32) form a motor driving unit, wherein the first reading head (13) is configured to read a rotation angle of the incremental circular grating (12) and to transmit the rotation angle to the motor driving board (32); and the motor driving unit is configured to drive the frameless torque motor rotor (18) to drive the rotating part to rotate according to a certain indexing scheme;

the first reading head (13) and the second reading head (23) are symmetrically installed on both sides of the incremental circular grating (12) and used to compensate for installation eccentric errors of the motor;

the wireless power supply transmitting end PCB (31), the rotating-end information acquisition and processing unit, the wireless power supply primary magnetic core (6), the wireless power supply primary winding (7), the wireless power supply secondary winding (8) and the wireless power supply secondary magnetic core (9) jointly form a wireless power supply unit, wherein the wireless power supply primary winding (7) and the wireless power supply secondary winding (8) are respectively placed in the wireless power supply primary magnetic core (6) and the wireless power supply secondary magnetic core (9), the wireless power supply transmitting end PCB (31) is configured to drive the wireless power supply primary winding (7); and the rotating-end information acquisition and processing unit of the rotating part is powered by magnetically coupled resonance between the wireless power supply primary winding (7) and the wireless power supply secondary winding (8);

the visible light receiving end PCB (4) in the rotating part and the infrared light receiving end PCB (3) in the fixed part form a bidirectional optical communication unit; the rotating-end information acquisition and processing unit is configured to acquire information of the inertial measurement unit; and the bidirectional optical communication unit is configured to transmit the data of the inertial measurement unit to the fixed-end information receiving and processing unit.

2. The single-axis rotational inertial navigation system based on bidirectional optical communication and wireless power supply according to claim 1, wherein the bidirectional optical communication unit consists of visible light communication and infrared light communication; the rotating-end information acquisition and processing unit is a rotating end PCB (11), which is configured to transmit data of the rotating part to the fixed-end information receiving and processing unit by means of the infrared light communication; the fixed-end information receiving and processing unit is a rotation modulation fixed end PCB (33), which is configured to transmit data of the fixed part to the rotating-end information acquisition and processing unit by means of the visible light communication, thus achieving bidirectional optical communication; and the bidirectional optical communication unit has a full-duplex communication function.

3. The single-axis rotational inertial navigation system based on bidirectional optical communication and wireless power supply according to claim 1, wherein the bidirectional optical communication unit is installed inside the magnetic cores of the wireless power supply unit and is coaxially provided; optical signals and electromagnetic signals do not interfere with each other, and the volume of the system is reduced while the wireless signal and energy transmission of the rotating part and the fixed part are achieved.

4. The single-axis rotational inertial navigation system based on bidirectional optical communication and wireless power supply according to claim 1, wherein the wireless power supply secondary winding (8) and the wireless power supply secondary magnetic core (9) are installed at the upper end of the rotating part, and the frameless torque motor rotor (18) is installed at the lower end of the rotating part; the wireless power supply unit and the frameless torque motor are placed at both ends of a rotating body (24) respectively, such that the influence of magnetic leakage on the wireless power supply unit and the frameless torque motor is reduced.

5. The single-axis rotational inertial navigation system based on bidirectional optical communication and wireless power supply according to claim 4, wherein the section of the lower end of the rotating body (24) is in a double-concave shape relative to the rotating center, a lower bearing (19) is installed in a concave groove, the frameless torque motor rotor (18) is installed on the rotating body (24) and coaxial with the rotating center, an upper bearing (5) and the lower bearing (19) are configured to bear axial force and radial force, and the frameless torque motor provides rotating power; and the motor driving board (32) is configured to read angle measurement data of the rotating body (24) provided by the first reading head (13) and to control the frameless torque motor to rotate according to the indexing scheme.

* * * * *